(12) United States Patent
Kim et al.

(10) Patent No.: US 9,137,532 B2
(45) Date of Patent: Sep. 15, 2015

(54) METHOD AND AN APPARATUS FOR INTER PREDICTION DECODING WITH SELECTIVE USE OF INVERSE QUANTIZATION AND INVERSE TRANSFORM

(71) Applicant: SK TELECOM CO., LTD., Seoul (KR)

(72) Inventors: Hayoon Kim, Seongman-si (KR); Byeungwoo Jeon, Seongman-si (KR); Joohee Moon, Seoul (KR); Yunglyul Lee, Seoul (KR); Haekwang Kim, Seoul (KR); Jungyoup Yang, Seoul (KR); Kwanghyun Won, Bucheon-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/302,738

(22) Filed: Jun. 12, 2014

(65) Prior Publication Data

US 2014/0294083 A1    Oct. 2, 2014

Related U.S. Application Data

(63) Continuation of application No. 13/121,895, filed as application No. PCT/KR2009/005524 on Sep. 28, 2009, now Pat. No. 8,811,487.

(30) Foreign Application Priority Data

Sep. 30, 2008 (KR) .................... 10-2008-0095871

(51) Int. Cl.
| | |
|---|---|
| *H04N 11/02* | (2006.01) |
| *H04N 19/51* | (2014.01) |
| *H04N 19/52* | (2014.01) |
| *H04N 19/503* | (2014.01) |
| *H04N 19/513* | (2014.01) |

(52) U.S. Cl.
CPC ....... *H04N 19/00684* (2013.01); *H04N 19/503* (2014.11); *H04N 19/513* (2014.11); *H04N 19/52* (2014.11)

(58) Field of Classification Search
USPC ........................................ 375/240.01–240.29
See application file for complete search history.

(56) References Cited

U.S. PATENT DOCUMENTS

| | | | | |
|---|---|---|---|---|
| 7,751,631 B2 * | 7/2010 | Youn et al. | ................... | 382/232 |
| 2004/0234144 A1 * | 11/2004 | Sugimoto et al. | ............. | 382/239 |

FOREIGN PATENT DOCUMENTS

| | | |
|---|---|---|
| KR | 100275694 B1 | 12/2000 |
| KR | 100364789 B1 | 12/2002 |
| KR | 1020050042275 A | 5/2005 |
| KR | 100542445 B1 | 1/2006 |

OTHER PUBLICATIONS

International Search Report mailed Apr. 29, 2010 for PCT/KR2009/005524, citing the above references.

* cited by examiner

*Primary Examiner* — Dave Czekaj
*Assistant Examiner* — Leron Beck
(74) *Attorney, Agent, or Firm* — Lowe Hauptman & Ham, LLP

(57) ABSTRACT

Disclosed is a method for decoding a video using an inter prediction. The method identifies one or more conditions for enabling an inverse quantization and an inverse transform, and selectively performs, based on the identified conditions, at least one of: skipping both of the inverse quantization and the inverse transform for the obtained residual data; inversely quantizing the obtained residual data and skipping the inverse transform for the inversely quantized residual data; and inversely quantizing and then inversely transforming the obtained residual data.

4 Claims, 11 Drawing Sheets

| SYMBOL | CODEWORD | CODE LENGTH |
|--------|----------|-------------|
| 0 | 1 | 1 bit |
| 1 | 010 | 3 bit |
| −1 | 011 | 3 bit |
| 2 | 00100 | 5 bit |
| −2 | 00101 | 5 bit |
| 3 | 00110 | 5 bit |
| −3 | 00111 | 5 bit |
| ...... | ...... | ...... |

METHOD AND AN APPARATUS FOR INTER PREDICTION DECODING WITH SELECTIVE USE OF INVERSE QUANTIZATION AND INVERSE TRANSFORM

CROSS REFERENCE TO RELATED APPLICATION

The instant application is a continuation of U.S. patent application Ser. No. 13/121,895, which is the national phase of international application PCT/KR2009/005524, filed on Sep. 28, 2009, which is based on and claims priorities to Korean Patent Application No. 10-2008-0095871, filed on Sep. 30, 2008. The disclosures of above-listed applications are hereby incorporated by reference herein in their entirety.

TECHNICAL FIELD

The present disclosure relates to a method and an apparatus for encoding or decoding a video using an inter prediction.

BACKGROUND ART

The statements in this section merely provide background information related to the present disclosure and may not constitute prior art.

As fast as the multimedia-related technology advances at unprecedented pace, demands for high quality of multimedia data such as audio, images, and videos are increasing. As a part of the development, international standards have been established on high efficiency video compressions to satisfy the needs for transmission, storage, and retrieval of such multimedia data within limited network resources. Especially for an international standard on video compressions, ISO/IEC JTC1/SC29 MPEG group and ITU-T VCEG group have created H.264/AVC MPEG-4 Part.10 standard, which attempts to achieve a high compression efficiency by using various prediction encoding methods such as variable block size motion estimation and compensation, intra prediction encoding, etc.

Through the motion estimation, motion vectors are generated and used to compensate the motions, and the conventional method of encoding/decoding the motion vectors in the video encoding/decoding space is to perform a prediction encoding with respect to a motion vector of a block estimated by using motion vectors of spatially adjacent blocks as predicted values. That is, because the motion vector of the current block has high correlations with motion vectors of the adjacent blocks, these motion vectors are used in calculating the predicted values which are generated as predicted motion vectors (PMV), and then an encoding is performed not on the true value of the motion vector of the current block but just on its differential values from PMVs in an effort to reduce the bit rate required to encode the motion vectors and improve the encoding efficiency.

Therefore, according to the typical motion vector encoding methods, the efficiency of compression is increased as the predicted motion vectors get closer to a motion vector of the current block. However, to have the closest predicted motion vectors relative to the motion vector of the current block, it is necessary to additionally encode information on what values to use as the predicted motion vectors which adds to the bit rate and deteriorates in the compression efficiency.

SUMMARY

In accordance with some embodiments of the present disclosure, a video decoding method using an inter prediction is provided. The method comprises: obtaining motion information and residual data from encoded data; generating a predicted block by performing the inter prediction based on the obtained motion information; identifying one or more conditions for enabling an inverse quantization and an inverse transform; skipping both of the inverse quantization and the inverse transform for the obtained residual data to thereby reconstruct a residual block directly from the obtained residual data, if the one or more identified conditions indicate skipping of both the inverse quantization and the inverse transform; inversely quantizing the obtained residual data and skipping the inverse transform for the inversely quantized residual data to thereby reconstruct a residual block using the inverse-quantized residual data, if the one or more identified conditions indicate skipping of the inverse transform; inversely quantizing the obtained residual data and inversely transforming the inversely quantized residual data to thereby reconstruct a residual block using the inverse transformed residual data, if the one or more identified conditions indicate non-skipping of both the inverse quantization and the inverse transform; and adding each pixel value of the predicted block to a corresponding pixel value of the reconstructed residual block.

In accordance with some embodiments of the present disclosure, a video decoding apparatus using an inter prediction is provided. The apparatus comprises an information extractor, a predictor, a decoder and an adder. The information extractor is configured to obtain motion information and residual data from encoded data. The predictor is configured to generate a predicted block by performing the inter prediction based on the obtained motion information. The decoder is configured to identify one or more conditions for enabling an inverse quantization and an inverse transform. It skips both of the inverse quantization and the inverse transform for the obtained residual data to thereby reconstruct a residual block directly from the obtained residual data, if the one or more identified conditions indicate skipping of both the inverse quantization and the inverse transform It inversely quantizes the obtained residual data and skips the inverse transform for the inversely quantized residual data to thereby reconstruct a residual block using the inverse-quantized residual data, if the one or more identified conditions indicate skipping of the inverse transform. Also, it inversely quantizes the obtained residual data and inversely transforms the inversely quantized residual data to thereby reconstruct a residual block using the inverse transformed residual data, if the one or more identified conditions indicate non-skipping of both the inverse quantization and the inverse transform. The adder is configured to add each pixel value of the predicted block to a corresponding pixel value of the reconstructed residual block.

The information extractor is further configured to obtain block mode information of a current block from the encoded data, and the predictor is further configured to perform the inter prediction in the unit of a block corresponding to the obtained block mode information.

Also, the decoder is further configured to identify the one or more conditions for enabling the inverse quantization and the inverse transform based on information included in the encoded data.

Herein, the motion information includes a differential motion vector and a reference picture index. The predictor is configured to select a candidate motion vector from one or more candidate motion vectors, reconstruct a current motion vector by adding the differential motion vector to the selected candidate motion vector, and generate the predicted block by using the current motion vector and a reference picture indicated by the reference picture index.

DETAILED DESCRIPTION

Figures 1, 2:
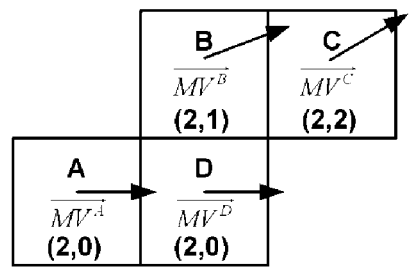
FIG. 1 is an exemplary diagram showing the procedure of encoding motion vectors according to H.264/AVC standard.
FIG. 2 is an exemplary diagram showing bit numbers per symbol for an entropy encoding.

Hereinafter, aspects of the present disclosure will be described in detail with reference to the accompanying drawings. In the following description, the same elements will be rather designated by the same reference numerals although they are shown in different drawings. Further, in the following description of the present disclosure, a detailed description of known functions and configurations incorporated herein will be omitted when it may blur the subject matter of the present disclosure.

In addition, to describe the components of the present disclosure, there may be terms used such as first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is an exemplary diagram showing the procedure of encoding motion vectors according to H.264/AVC standard.

In FIG. 1, block D is a current block whose motion vector is up for encoding, and blocks A, B, and C are adjacent blocks with respect to current block D. Referring to FIG. 1, $\overrightarrow{MV^A}$, $\overrightarrow{MV^B}$, $\overrightarrow{MV^C}$, and $\overrightarrow{MV^D}$ are motion vectors (MV) that blocks A, B, C, and D have, and they are respectively defined as having horizontal components ($MV^A_x$, $MV^B_x$, $MV^C_x$, and $MV^D_x$) and vertical components ($MV^A_y$, $MV^B_y$, $MV^C_y$, and $MV^D_y$).

Here, the motion vector of the current block $\overrightarrow{MV^D}$ is (2, 0), and the adjacent block motion vectors $\overrightarrow{MV^A}$, $\overrightarrow{MV^B}$, and $\overrightarrow{MV^C}$ are assumed to be (2, 0), (2, 1), and (2, 2), respectively. In addition, a PMV or predicted motion vector $\overrightarrow{PMV^D}$ for current (block) motion vector $\overrightarrow{MV^D}$ is calculated as in Equation 1 below, and predicted motion vector $\overrightarrow{PMV^D}$ is defined as having a horizontal component $PMV^D_x$ and a vertical component $PMV^D_y$.

$$\overrightarrow{PMV^D} = \begin{bmatrix} PMV^D_x \\ PMV^D_y \end{bmatrix} = \begin{bmatrix} \text{Median}(MV^A_x, MV^B_x, MV^C_x) \\ \text{Median}(MV^A_y, MV^B_y, MV^C_y) \end{bmatrix} \quad \text{Equation 1}$$

Reviewing Equation 1, it can be seen that the predicted motion vector for the motion vector of the current block is calculated with Median(□) which calculates the median of motion vectors of adjacent blocks A, B, and C. Upon obtaining predicted motion vector $\overrightarrow{PMV^D}$ for current motion vector $\overrightarrow{MV^D}$ using Equation 1, Equation 2 may set out to subtract the predicted motion vector from the motion vector of the current block to be encoded in order to generate a differential motion vector $\overrightarrow{DMV^D}$, which undergoes a predefined method of entropy encoding or others for encoding and storage (or transmission).

$$\overrightarrow{DMV^D} = \overrightarrow{MV^D} - \overrightarrow{PMV^D} = \begin{bmatrix} MV^D_x - PMV^D_x \\ MV^D_y - PMV^D_y \end{bmatrix} \quad \text{Equation 2}$$

As illustrated in FIG. 1, if current motion vector $\overrightarrow{MV^D}$ is (2, 0), its predicted motion vector using the median by Equation 1 becomes (2, 1), and differential motion vector $\overrightarrow{DMV^D}$ by Equation 2 is (0, −1).

FIG. 2 is an exemplary diagram showing bit numbers per symbol for an entropy encoding.

When encoding differential motion vector $\overrightarrow{DMV^D}$ described in FIG. 1 by using the table of FIG. 2 for the entropy encoding, it is necessary to spend four bits (1 bit for the horizontal component and 3 bits for the vertical component). In comparison, using $\overrightarrow{MV^A}$ of (2, 0) as the predicted motion vector turns differential motion vector $\overrightarrow{DMV^D}$ into (0, 0), requiring 2 bits (1 bit for the horizontal component and 1 bit for the vertical component) for encoding this value. Therefore, compared to using predicted motion vector with a median, 2 bits of reduction are obtained.

However, for $\overrightarrow{MV^A}$ to be used as the predicted motion vector, it is necessary to provide an extra transmission of information on which one of motion vectors $\overrightarrow{MV^A}$, $\overrightarrow{MV^B}$, and $\overrightarrow{MV^C}$ are used as the predicted motion vector PMV ant it cannot be guaranteed to see an improvement of the compression efficiency. Thus, in order to achieve an even higher encoding efficiency, there is a need for a method which obviates the additional information on a certain predicted value used but still encodes the motion vector with more accurate predicted value.

Figure 3:
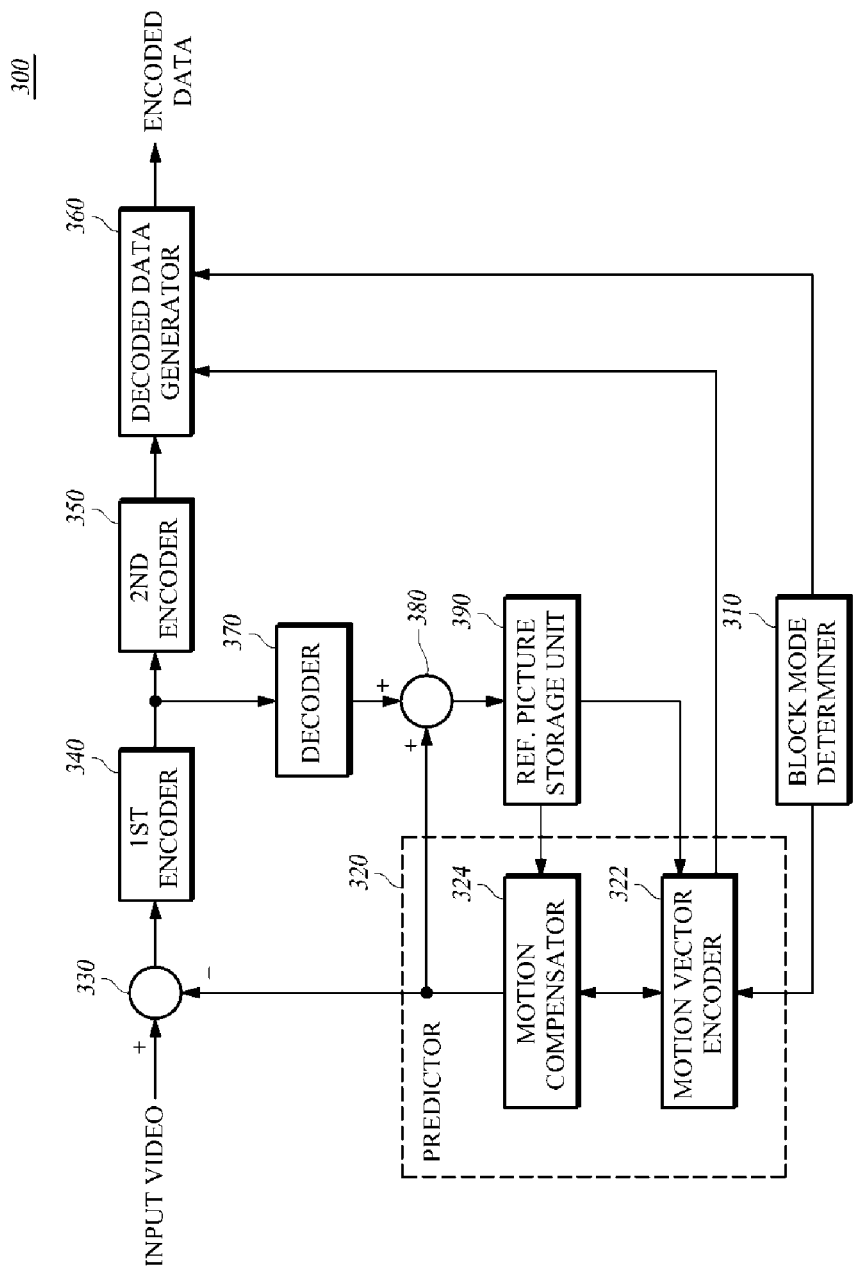
FIG. 3 is a block diagram schematically showing a video encoding apparatus according to an aspect.

FIG. 3 is a block diagram schematically showing a video encoding apparatus 300 according to an aspect.

This aspect of video encoding apparatus 300 may comprise a block mode determiner 310, a predictor 320, a subtractor 330, a first encoder 340, a second encoder 350, a decoded data generator 360, decoder 370, an adder 380, and a reference picture storage unit 390. Such video encoding apparatus 300 may be a personal computer PC, notebook or laptop computer, portable terminal or personal digital assistant PDA, portable multimedia player PMP, PlayStation Portable PSP, or mobile communication terminal, smart phone or such devices, and represent a variety of apparatuses equipped with, for example, a communication device such as a modem for carrying out communications between various apparatuses or wired/wireless communication networks, a memory for storing various programs for encoding videos and related data, and a microprocessor for executing the programs to effect operations and controls.

Block mode determiner 310 applies an optimal criterion (for example, rate-distortion optimization criterion) with respect to block modes selected by the current block to be currently encoded out of a video in order to determine the block mode of the current block (for example, block mode with a lowest rate-distortion cost). If video encoding apparatus 300 has a block mode preset therein, block mode determiner 310 is not necessarily included in video encoding apparatus 300 and may be selectively absent.

Predictor 320 predicts the current block to generate and output a predicted block. Specifically, predictor 320 predicts the pixel values of the respective pixels of the current block for encoding from the video to generate predicted blocks having predicted pixel values of the respective predicted pixels. Such predictor 320 in case of performing an inter prediction may comprise a motion vector encoder 322 and a motion compensator 324.

Motion vector encoder 322 generates, encodes, and outputs motion information by using a first motion vector and a second motion vector which are estimated by referring to one or more reference pictures in reference picture storage unit 390 in units of blocks which correspond to the block mode of the current-block block mode from block mode determiner 310 or to a preset block mode (such as by 16×16 blocks, 16×8 blocks, 8×16 blocks, 8×8 blocks, 8×4 blocks, 4×8 blocks, and 4×4 blocks). At this time, motion vector encoder 322 may output index information on the reference pictures which is information for identifying the reference pictures used to estimate the first and second motion vectors.

Here, motion vector encoder 322 may use the index information on the reference pictures outputted from block mode determiner 310 or use the index information on a preset reference picture, and it may refer to a reference picture identified by the reference picture index information in estimating the first and second motion vectors. In addition, motion vector encoder 322, in the case where merely the block mode is outputted from block mode determiner 310 or the index information on the preset reference picture is not preset, may calculate errors of the respective blocks by block mode out of the reference pictures positioned temporally adjacent to the current picture for encoding in an applicable condition for encoding as the reference picture blocks are compared against the current block, and by using the reference picture containing the least error as a reference, motion vector encoder 322 may estimate the first and second motion vectors. A detailed description of motion vector encoder 322 will follow in the descriptions with reference to FIG. 4.

Motion compensator 324 uses the motion vector of the current block from motion vector encoder 322 that is the second motion vector for incorporation into the reference picture identified by the reference picture index information from the same motion vector encoder 322 so as to generate and output a predicted block of the current block.

Subtractor 330 subtracts the predicted block from the current block to generate a residual block. In other words, subtractor 330 calculates the differences between the pixel values of the respective pixels in the current block and the predicted pixel values of the respective pixels in the predicted block from predictor 320.

First encoder 340 performs a transform and quantization with respect to the residual block to output a residual block. That is, first encoder 340 transforms the residual signal of the residual block to a frequency domain so that the respective pixels in the residual block are transformed into frequency coefficients in order to quantize the residual block having the frequency coefficients. Here, first encoder 340 in transforming the residual signal into the frequency coefficients may use Hadamard transform, discrete cosine transform (DCT) based transform and various other transform techniques which transform image signals on the spatial axis to those on the frequency axis, wherein the residual signals in the frequency domain transform are the frequency coefficients. In addition, first encoder 340 may quantize the transformed residual block by using a dead zone uniform threshold quantization (called DZUTQ hereinafter), a quantization weighted matrix, or its improved quantization techniques.

Meanwhile, although the above description states that first encoder 340 performs the transform and quantization on the residual block, it may transform the residual signal of the residual block to generate the residual block having the frequency coefficients and choose not to perform the quantization step, or it may not perform transforming the residual signal of the residual block to the frequency domain but the quantization, or it may perform none of the transform and the quantization steps. In the nonperformance of both steps, first encoder 340 may be omitted from video encoding apparatus 300 of this aspect of the present disclosure.

Second encoder 350 encodes the residual block outputted from first encoder 340. That is, second encoder 350 scans quantized frequency coefficients, frequency coefficients, or residual signals of the residual block in various scanning methods such as a zig-zag scanning to generate a quantized frequency coefficient sequence, a frequency coefficient sequence, or a signal sequence, and encodes it by using various encoding techniques such as an entropy coding and others. Alternatively, first encoder 340 and second encoder 350 may be functionally combined into an implementation of an encoding unit.

Encoded data generator 360 generates and outputs encoded data which includes the encoded residual block from encoder 350 and the encoded motion information from motion vector encoder 322. In addition, encoded data generator 360 may incorporate information on the block mode of the current block into the encoded data before its output, wherein the information on the block mode is outputted from block mode determiner 310 or preset. Encoded data generator 360 may be implemented by a multiplexer (MUX).

Decoder 370 performs an inverse quantization and inverse transform with respect to the residual block quantized by first encoder 340. In detail, decoder 370 inversely quantizes the quantized frequency coefficient of the quantized residual block to generate a residual block with the frequency coefficient, and has this inversely quantized residual block inversely transformed to generate a residual block with pixel values or reconstructed residual block. Here, decoder 370 may perform the inverse transform and the inverse quantization by inversely applying the transform and quantization methods that were used in first encoder 340. In addition, if just the transform is performed in first encoder 340 without a quantization performed, decoder 370 may perform the inverse transform only but no inverse quantization while if just the quantization is performed in first encoder 340 without a transform performed, just the inverse quantization may be performed but no inverse quantization. If none of the transform and quantization are performed in first encoder 340 or first encoder 340 is excluded from the constitution of video encoding apparatus 300, decoder 370 may likewise skip both the inverse transform and inverse quantization or be excluded from the constitution of video encoding apparatus 300.

Adder 380 adds the residual block reconstructed by decoder 370 to the predicted block from predictor 320 to reconstruct the current block. Reference picture storage unit 390 stores the reconstructed current block from adder 380 in unit of pictures to be a reference picture for future use by predictor 320 as it encodes the following or other subsequent blocks.

Although not shown in FIG. 3, based on H.264/AVC standard, the described video encoding apparatus 300 of an aspect may further include an intra predictor for intra prediction and a deblocking filter for deblocking filtering the reconstructed current block. In addition, based on H.264/AVC standard, first encoder 340 and second encoder 370 may perform additional transform and quantization (or inverse transform and inverse quantization) with respect to a particular picture (for example, intra picture). Here, the deblocking filtering refers to the process for reducing a block distortion generated in an encoding operation which may selectively apply the deblocking filter to a block boundary and a macroblock boundary, apply the deblocking filter to just the macroblock boundary, or applying no deblocking filter.

Figure 4:
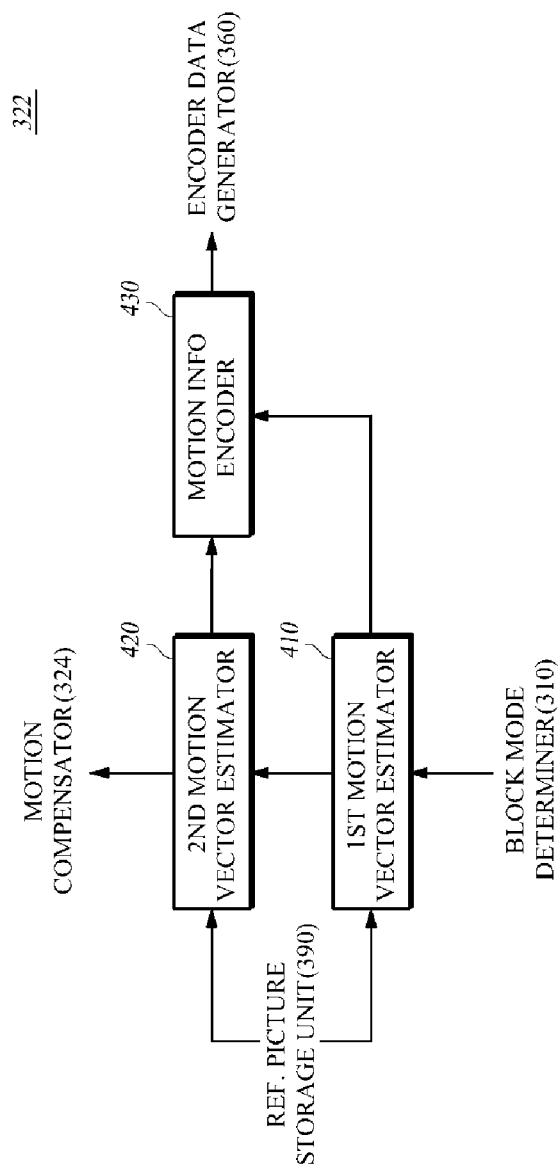
FIG. 4 is a block diagram schematically showing the construction of a motion vector encoding apparatus according to an aspect.

FIG. 4 is a block diagram schematically showing the construction of a motion vector encoding apparatus according to an aspect.

The motion vector encoding apparatus may be implemented into motion vector encoder 322 within video encoding apparatus 300 of an aspect, and thus will be called motion vector encoder 322 for the sake of descriptive convenience.

Motion vector encoder 322 according to an aspect may comprise a first motion vector estimator 410, second motion vector estimator 420, and motion information encoder 430.

Figure 5:
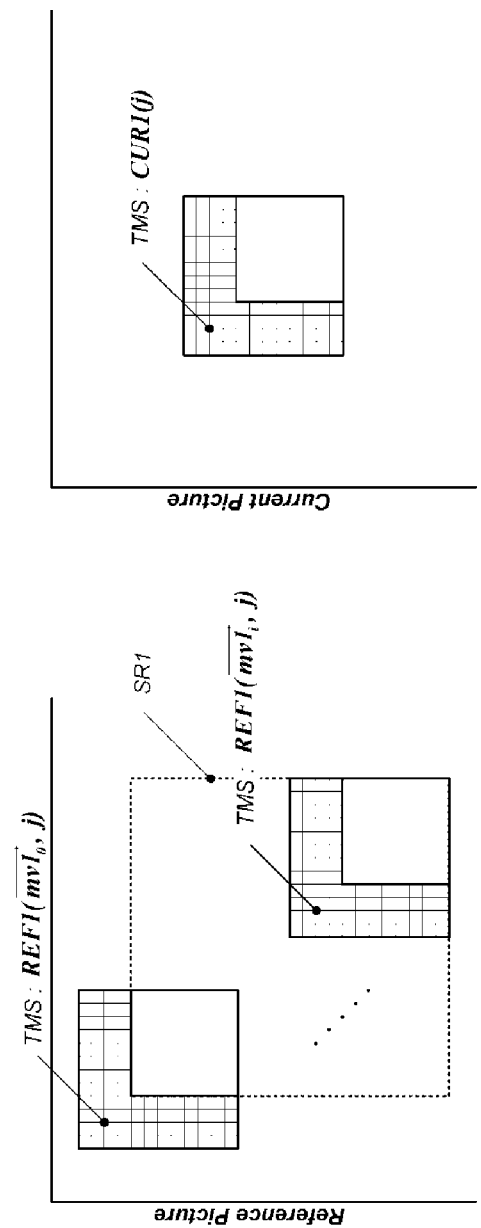
FIG. 5 is an exemplary diagram showing a procedure of estimating a first motion vector according to an aspect.

First motion vector estimator 410 estimates a first motion vector from motion vectors within a predetermined search range for estimating the first motion vector following a predetermined first estimation criterion which is shared in advance by video encoding apparatus 300 and a video decoding apparatus in the following description to help the decoding apparatus independently estimate first motion vector. For an example of the predetermined first estimation criterion, a template matching (TM) method as shown in FIG. 5 may be used.

$$\overrightarrow{MV1} = \underset{i \in SR1}{\operatorname{argmin}} f_{dec}(\overrightarrow{mv1}_i | c_{dec}) \qquad \text{[Equation 3]}$$

$$f_{dec}(\overrightarrow{mv1}_i | c_{dec}) = TM(\overrightarrow{mv1}_i | c_{dec})$$
$$= TM(\overrightarrow{mv1}_i | REF1, CUR1)$$
$$= \sum_{j \in TMS} \{REF1(\overrightarrow{mv1}_i, j) - CUR1(j)\}^2$$

In Equation 3, the search range SR1 represents the area in the reference picture for estimating the first motion vector. For example, referring to FIG. 5, a search range conceivable is defined by horizontal eight pixels by vertical eight pixels. Additionally in Equation 3, a template matching set TMS is set of indices js which designate relative locations of pixels used for a matching of adjacent pixels. The method for matching adjacent pixies, when considered with respect to a finite number of indices js in TMS, determines an estimation error as defined by the difference between a pixel value CUR1(j) correspondingly indicated by index j neighboring the current block and a pixel value REF1($\overrightarrow{mv}_i$,j) correspondingly indicated by index j neighboring a reference block on the reference picture obtained by using candidate motion vectors $\overrightarrow{mv1}_i$ within the search range SR1 for the motion estimation.

Because the corresponding pixel value CUR1(j) of the current picture is a reconstructed video finished with the encoding and decoding processes, it is recognizable by both video encoding apparatus 300 and the video decoding apparatus.

As with REF1 and CUR1, the conditions which are recognizable by the video decoding apparatus and used for the estimation of the first motion vector are called a predetermined decoding condition $C_{dec}$. In other words, the candidate motion vector causing the least estimation error within a search range is estimated to be the first motion vector $\overrightarrow{MV1}$ that the video decoding apparatus can estimate. Although Equation 3 used sum of squared difference SSD to calculate the estimation error, other methods may be applied such as sum of absolute difference SAD as are appropriate to the applications of the disclosure and its purposes.

In addition, as was estimated in the video encoding apparatus, if the same first motion vector can be estimated in the video decoding apparatus using the previously reconstructed predetermined encoding condition $C_{dec}$ (for example, the previously reconstructed neighboring pixel values being present in the reference picture and the current picture and corresponding to the current block), other estimation criterion may also be used than the template matching TM. For example, in the event of estimating the first motion vector by using the described median calculation method for H.264/AVC, the first motion vector of the current block as shown in FIG. 1 may be calculated as in Equation 4 using motion vectors of the neighboring blocks, and $\overrightarrow{MV1}$ in Equation 4 can be equally estimated by the video encoding apparatus using the previously reconstructed predetermined encoding condition $C_{dec}$. In this occasion, $C_{dec}$ is set to be the previously reconstructed motion vectors of the neighboring blocks of the current block.

$$\overrightarrow{MV1} = \begin{bmatrix} MV1_x \\ MV1_y \end{bmatrix} = \begin{bmatrix} \text{Median}(MV_x^A, MV_x^B, MV_x^C) \\ \text{Median}(MV_y^A, MV_y^B, MV_y^C) \end{bmatrix} \qquad \text{[Equation 4]}$$

In other words, under the assumption that the video encoding apparatus and video decoding apparatus predefine so and according to the applications of the disclosure and its purposes, the first estimation criterion may be defined by various methods such as the median calculation method, boundary matching BM method, and others.

Figure 6:
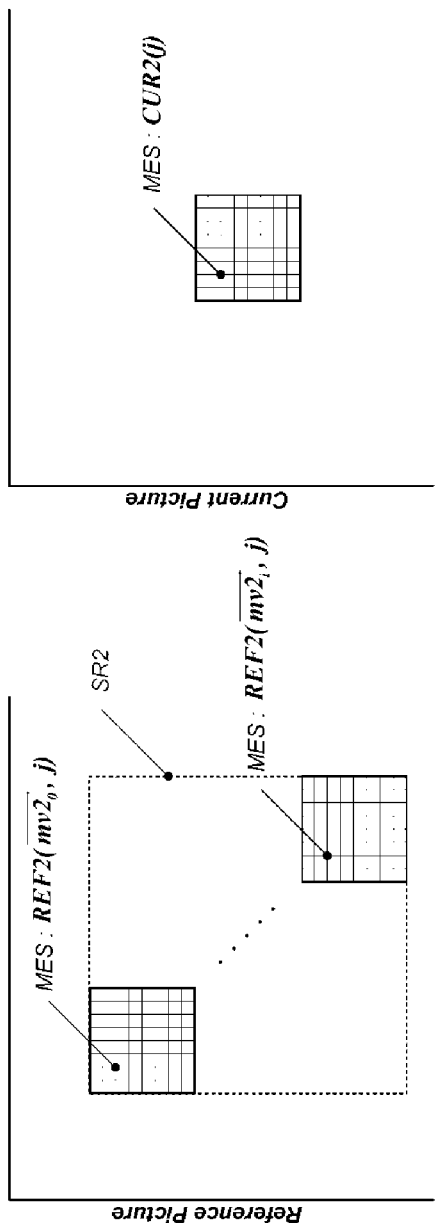
FIG. 6 is an exemplary diagram showing a procedure of estimating a second motion vector according to an aspect.

Second motion vector estimator 420 determines the second motion vector that may be estimated by video encoding apparatus 300 by a predetermined second estimation criterion, among motion vectors included in a search range for second motion vectors. As illustrated in FIG. 6, second motion vector estimator 420 estimates the second motion vector through estimating the motion vector for the current block by the second estimation criterion which can be used only by video encoding apparatus 300. A rate-distortion optimization criterion as in Equation 5 may be the above second estimation criterion, although other criterion may be used.

$$\overrightarrow{MV2} = \underset{i \in SR2}{\operatorname{argmin}} f_{enc}(\overrightarrow{mv2}_i | c_{enc}) \qquad \text{[Equation 5]}$$

$$f_{enc}(\overrightarrow{mv2}_i | c_{enc}) =$$
$$J(\overrightarrow{mv2}_i | c_{enc}) = D(\overrightarrow{mv2}_i | c_{enc}) + \lambda R(\overrightarrow{mv2}_i | c_{enc})$$

In Equation 5, $\overrightarrow{mv2}_i$ is candidate motion vectors included in a search range SR2 for estimating the second motion vector, and $\overrightarrow{MV2}$ represents a second motion vector which is included in the candidate motion vector and minimizes $f_{enc}$ (□) for representing the second estimation criterion. Here, the search range SR1 for estimating the first motion vector and the search range SR2 for estimating the second motion vector are not necessarily equal to each other. As described, the predetermined estimation criterion $f_{enc}$(□) is preferably a rate-distortion-distortion optimization function J(□). J(□) may be represented by a distortion function D(□) and a rate function R(□).

In an aspect of the disclosure, a predetermined encoding condition $C_{enc}$ means a factor which influences the determination of the second motion vector. Referring to FIG. 6 and Equation 5, the pixel values of the current picture and the pixel values of the reference block used as the reference picture may correspond to the encoding condition $C_{enc}$. In an aspect of the disclosure, distortion function D(□) and rate function R(□) may be calculated through Equation 6, and $\overrightarrow{MV1}$ used in rate function R(□) means the first motion vector that is obtained from performing the estimation thereof.

$$D(\overrightarrow{mv2_i} \mid c_{enc}) = D(\overrightarrow{mv2_i} \mid REF2, CUR2) = \sum_{j \in MES} \{REF2(\overrightarrow{mv2_i}, j) - CUR2(j)\}^2$$

$$R(\overrightarrow{mv2_i} \mid c_{enc}) = R(\overrightarrow{mv2_i} \mid \overrightarrow{MV1}) = R(\overrightarrow{mv2_i} - \overrightarrow{MV1})$$

[Equation 6]

In Equation 6, MES (motion estimation set) is a set of indices j for designating the locations of the pixels used for block matching and represents the pixel locations of the current block of which the second motion vectors are sought. Although MES is typically defined as representing the entire pixels in the current block (or reference block), it may be limited to represent partial pixel locations depending on the applications such as a fast matching and others.

As an exception, although the predetermined second estimation criterion may have been defined as in the aspect described, it may not be so limited but variably defined depending on the applications of the disclosure and its purposes. For example, it is possible to omit rate function R(□) in order to reduce the complexity of video encoding apparatus 300, or to repurpose $\overrightarrow{MV1}$ used in rate function R(□) from being the first motion vector outputted through performing the first motion vector estimation into a preset default value like the median. In this case, since it is not necessary for second motion vector estimator 420 to use the first motion vector from first motion vector estimator 410, first motion vector estimator 410 and second motion vector estimator 420 may be switched at implementation without departing from the intrinsic characteristics of the present disclosure.

Besides, as the predetermined first estimation criterion used by first motion vector estimator 410 and the predetermined second estimation criterion used by second motion vector estimator 420, different forms of $f_{enc}$(□) and $f_{dec}$(□) may be used depending on the applications of the disclosure and its $f_{dec}$(□) purposes. However, as described, how well $f_{enc}$(□) and $f_{dec}$(□) will cause the same result become a factor that affects the performance of the present disclosure.

Therefore, by the degree that $f_{enc}$(□) and $f_{dec}$(□) lead to the same result, more effective $f_{dec}$(□) may be defined. In addition, if the degree, that $f_{dec}$(□) following the defined $f_{enc}$(□) leads to the same result, varies by an arbitrary unit (for example, unit of pictures and unit of slices in the video encoding and decoding methods), it is possible to use predictably or by predicting more effective $f_{dec}$(□) from various predetermined estimation criterion. For example, it is possible that for the (n−1)th picture the template matching TM method is predictably the most effective $f_{enc}$(□) that leads to the same result as $f_{dec}$(□) while for the n-th picture the boundary matching BM method is predictably the most effective $f_{dec}$(□) that leads to the same result as $f_{enc}$(□). In this case, video encoding apparatus 300 may agree with the video decoding apparatus in defining an arbitrary condition to use $f_{dec}$(□) as the estimation criterion, or in the absence of such a common definition of the arbitrary condition, information may be delivered on an arbitrary-unit basis to the video decoding apparatus to tell what type of $f_{dec}$(□) was used.

Meanwhile, although FIG. 4 suggests that first motion vector estimator 410 and second motion vector estimator 420 are constructed independently of each other, they may be incorporated at implementation into a motion vector estimator (not shown).

Motion information encoder 430 uses the first motion vector from first motion vector estimator 410 and the second motion vector from second motion vector estimator 420 to generate motion information, and encodes the same for storage or output by using a predefined encoding technique such as entropy encoding or others.

Here, in encoding the motion information generated by using the first motion vector and the second motion vector, motion information encoder 430 may utilize various methods without departing from the intrinsic characteristics of the present disclosure. For an example, as in Equation 7, motion information encoder 430 may either generate for encoding the difference between the first motion vector and the second motion vector as the motion information, or generate for encoding just the second motion vector as the motion information.

$$\overrightarrow{MV} = \overrightarrow{MV2} - \overrightarrow{MV1} = \begin{bmatrix} MV2_x - MV1_x \\ MV2_y - MV1_y \end{bmatrix}$$

[Equation 7]

For another example, when encoding the difference between the first motion vector and the second motion vector or the second motion vector as described in the first example, motion information encoder 430 may perform the entropy encoding with different variable length coding VLC tables used on the basis of the first motion vector. In other words, by analyzing the first motion vector its characteristics (such as magnitude, direction, and others) may be grasped which in turn allow the characteristics of the video to be recognized in order to encode the motion vector adapted to the characteristics of the video by using not a set VLC table but different VLC tables by the characteristics of the video. In this way, encoding with different variable length coding VLC tables on the basis of the first motion vector is called a conditional entropy encoding.

The conditional entropy encoding may be specified and implemented as will be described. For example, when the magnitude is set as a characteristics reference among the different first motion vector characteristics, it is possible to encode the motion information by selectively using different VLC tables among a number of them according to the magnitude of the first motion vector. If a first boundary value and a second boundary value were set in advance as the characteristics reference for allowing an identification of the magnitude of first motion vector with an assumption that the available multiple VLC tables are a first VLC table to a third VLC table, encoding of the motion information may be performed by using the first VLC table when the absolute value of the magnitude of the first motion vector is under the first boundary value, using the second VLC table when the absolute magnitude value of the first motion vector is equal to or over the first boundary value and under the second boundary value, and using the third VLC table when the absolute magnitude value of the first motion vector is equal to or over the second boundary value. Here, the available multiple VLC tables may be such tables that can effectively encode the motion vector by its magnitude, and those tables may be determined in an equation form or empirically.

Figure 7:
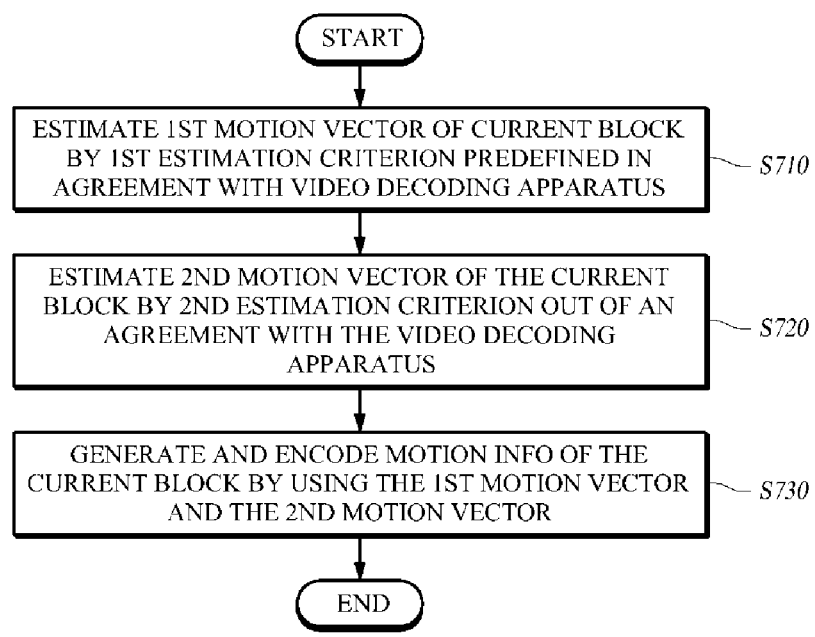
FIG. 7 is a flow diagram showing a motion vector encoding method according to an aspect.

FIG. 7 is a flow diagram showing a motion vector encoding method according to an aspect.

The motion vector encoding apparatus or motion vector encoder 322 shown in FIG. 3 estimates a first motion vector of the current block by a first estimation criterion predefined in agreement with the video decoding apparatus in step S710. In other words, motion vector encoder 322 may estimate the same first motion vector that the video decoding apparatus can estimate from the motion vectors included in the search range for estimating the first motion vectors, according to the predetermined first estimation criterion shared or commonly defined in advanced by video encoding apparatus 300 and the video decoding apparatus.

In addition, motion vector encoder 322 estimates a second motion vector of the current block by a second estimation criterion out of an agreement with the video decoding apparatus in step S720. In other words, motion vector encoder 322 may estimate the second motion vector that only video decoding apparatus 300 can estimate from the motion vectors included in the search range for estimating the second motion vectors, according to a predetermined second estimation.

In addition, motion vector encoder 322 generates and encodes motion information of the current block by using the first motion vector and the second motion vector in step S730. In other words, motion vector encoder 322 uses the first motion vector estimated in step S710 and the second motion vector estimated in step S720 to generate the motion information for a subsequent encoding and storing or outputting. Here, the procedures for estimating the first and second vectors and generating the motion information for encoding are identical to the description through FIG. 4 and it will be saved from repeating.

However, although FIG. 7 illustrates that the steps of the encoding method are S710 followed by S720, the sequence is merely as aspect and may be switched in implementation within the scope of the present disclosure. For example, to the contrary of FIG. 7 illustration, step S720 may precede step S710 depending on the applications of the disclosure and its purposes.

Figure 8:
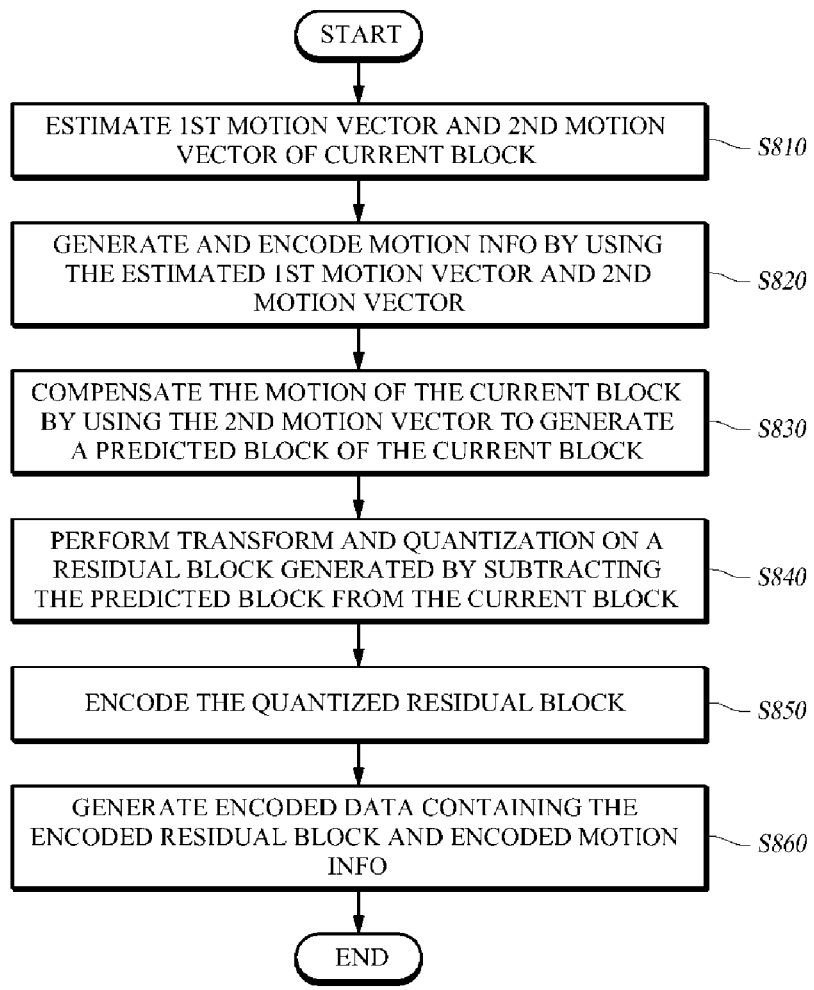
FIG. 8 is a flow diagram showing a video encoding method according to an aspect.

FIG. 8 is a flow diagram showing a video encoding method according to an aspect.

An aspect of video encoding apparatus 300, upon receiving an image to be encoded, determines the block mode of the image to classify the image in unit of macroblocks or their subblocks and determines an optimal one of various encoding modes such as an inter prediction mode or an intra prediction mode in which the current block to be encoded is predicted for encoding.

At this time, the inter prediction mode is selected as the encoding mode for carrying out the inter prediction, video encoding apparatus 300 estimates a first motion vector and a second motion vector of the current block in step S810, generates and encodes motion information by using the estimated first motion vector and second motion vector in step S820, and compensates the motion of the current block by using the motion information to generate a predicted block of the current block in step S830. Here, the steps S810 and S830 may be similarly sequenced in operation to that as described in FIG. 7.

In addition, video encoding apparatus 300 performs transform and quantization on a residual block generated by subtracting the predicted block from the current block in step S840, encodes the quantized residual block in step S850, and generates encoded data containing the encoded residual block and encoded motion information for outputting in step S860. At this time, video encoding apparatus 300 may generate encoded data further containing a predetermined block mode. Here, the procedures for generating the residual block by using the predicted block and the transform and quantization are identical to the description through FIG. 3 and it will be saved from repeating.

In addition, although step S840 is described as transforming and quantizing the residual block, either tasks may not be performed or a selected one of them may be performed, and in this case step S850 may follow suit and encode the residual block without the transform and quantization or with either the transform or quantization performed thereto.

As described above, the video processed into encoded data by video encoding apparatus 300 may then be transmitted in real time or non-real-time to a video decoding apparatus described below for decoding the same followed by its reconstruction and reproduction into the video via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 9:
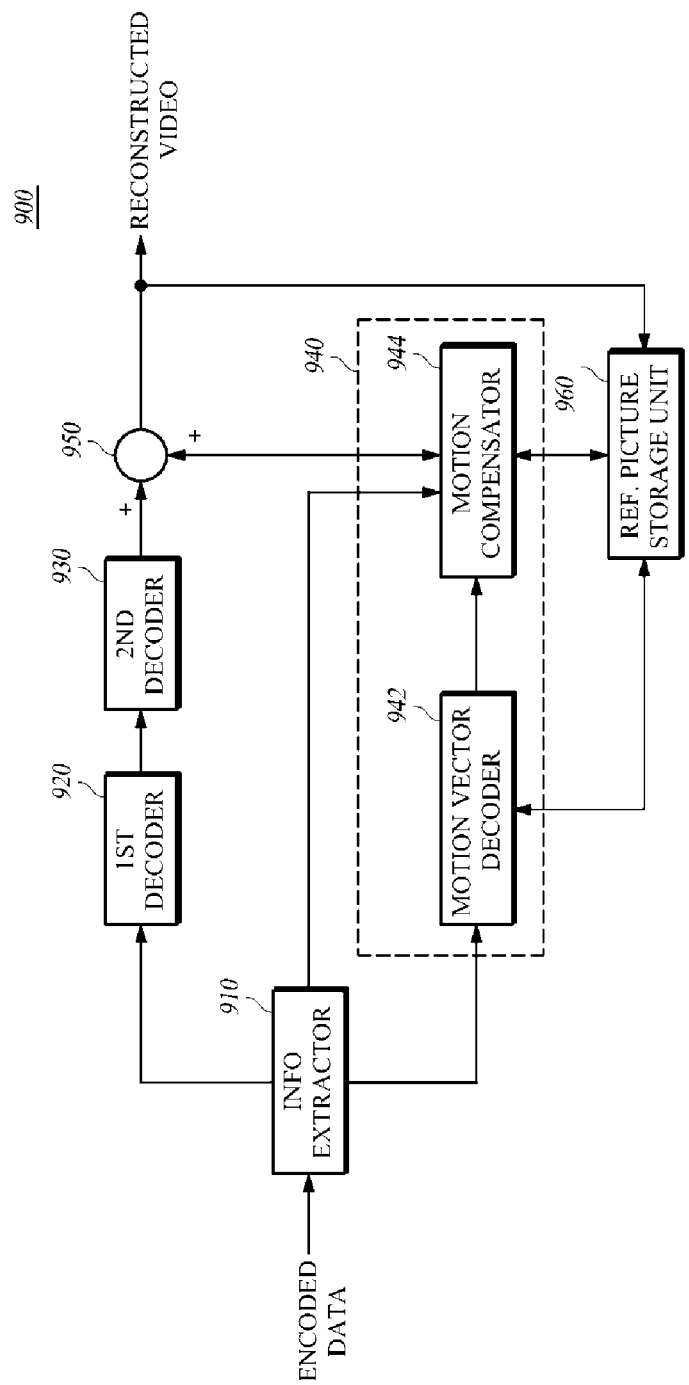
FIG. 9 is a block diagram schematically showing the construction of a video decoding apparatus according to an aspect.

FIG. 9 is a block diagram schematically showing the construction of a video decoding apparatus 900 according to an aspect.

Video decoding apparatus 900 may comprise an information extractor 910, a first decoder 920, a second decoder 930, a predictor 940, an adder 950, and reference picture storage unit 960. Video decoding apparatus 900 may be a personal computer or PC, notebook or laptop computer, personal digital assistant or PDA, portable multimedia player or PMP, PlayStation Portable or PSP, or mobile communication terminal or such devices, and may mean a variety of apparatuses equipped with, for example, a communication device such as a modem for carrying out communications between various devices or wired/wireless communication networks, a memory for storing various programs for decoding videos and related data, and a microprocessor for executing the programs to effect operations and controls.

Upon receiving the encoded data inputted, information extractor 910 extracts information on a block mode (for example, identifier) and outputs information on the extracted block mode. Additionally, if the block mode is a motion vector skip mode (block mode being, for example, intra-16× 16 mode, intra-4×4 mode, etc.), instead of extracting the motion information from the encoded data, it is possible to extract the encoded residual block for outputting. Otherwise, if the block mode is not the motion vector skip mode (block mode being, for example, inter-16×16 mode, inter-4×4 mode, P8×8-mode, etc.), Information extractor 910 extracts the encoded motion information and the encoded residual block from the encoded data for outputting. At this time, information extractor 910 may further extract index information for a reference picture from the encoded data for outputting.

First decoder 920 decodes the encoded residual block outputted from information extractor 910. In other words, first decoder 920 decodes binary data of the encoded residual block by using, for example, an entropy encoding technique to generate a quantized frequency coefficient sequence and process the same with an inverse scan in various scanning methods such as an inverse zig-zag scanning to generate a residual block having the quantized frequency coefficient sequence. If the binary data of the encoded residual block is such binary data from frequency coefficients encoded, the residual block decoded by first decoder 920 will become the one having the frequency coefficients while if the binary data of the encoded residual block is such binary data from a residual signal encoded without going through a transform and a quantization, the residual block decoded by first decoder 920 will become the one having the residual signal. Meanwhile, though described as a function of first decoder 920 by its structural option, a step of the entropy decoding with respect to the binary data of the residual block encoded by, for example, the entropy encoding technique, may be implemented into information extractor 910.

Second decoder 930 performs an inverse quantization and an inverse transform on the decoded residual block from first decoder 920 to reconstruct the residual block. Specifically, second decoder 930 performs the inverse quantization on the quantized frequency coefficients of the decoded residual block outputted from first decoder 920 and performs the inverse transform on the inversely quantized frequency coefficients to reconstruct the residual block having the residual signal. As second decoder 930 performs both the inverse quantization and inverse transform if the decoded residual block from first decoder 920 has the quantized frequency coefficients, second decoder 930 may choose to perform the inverse transform skipping the inverse quantization if the decoded residual block from first decoder 920 has the frequency coefficients, or second decoder 930 may perform neither the inverse transform nor the inverse quantization and alternatively it may not be incorporated into video decoding apparatus 900 if the decoded residual block from first decoder 920 has just the residual signal. Meanwhile, though FIG. 9 illustrates that first decoder 920 and second decoder 930 are independently configured, their functions may be configured in integration into a decoder (not shown).

Predictor 940 predicts the current block to generate a predicted block. Such predictor 940 may comprise a motion vector decoder 942 and a motion compensator 944. Motion vector decoder 942 predicts a first motion vector in unit of blocks which are selected from a reference picture stored in reference picture storage unit 960 and correspond to the block mode according to block mode information outputted from information extractor 910, decodes the encoded motion information from information extractor 910 to reconstruct the motion information, and uses the reconstructed motion information and an estimated first motion vector to reconstruct a second motion vector which is the motion vector of the current block. In this way, the reconstructed second motion vector becomes the motion vector of the current block. Motion compensator 944 generates a predicted block by so predicting a reference block indicated by the motion vector of the current block or the reconstructed second motion vector from the reference picture stored in reference picture storage unit 960 that the reference block is the reference bock of the current block. Here, in using the reference picture, motion vector decoder 942 is responsive to index information on the reference picture outputted from information extractor 910 for taking the reference picture selected from a number of reference pictures stored in reference picture storage unit 960 and identified by the index information on the reference picture.

Adder 950 adds the reconstructed residual block from second decoder 930 to the predicted block from a prediction at predictor 940 to reconstruct the current block. Such reconstruction of current block may be accumulated into an output of a reconstructed image or stored as a reference picture in reference picture storage unit 960 and used for predicting the subsequent block.

Although not shown in FIG. 9, video decoding apparatus 900 in the described aspect may further include an intra predictor, a deblocking filter for processing the reconstructed current block, and more based on H.264/AVC standard. In addition, based on H.264/AVC standard, second decoder 930 may additionally perform an inverse transform and inversely quantizing operation with respect to a particular picture (for example, intra picture).

Figure 10:
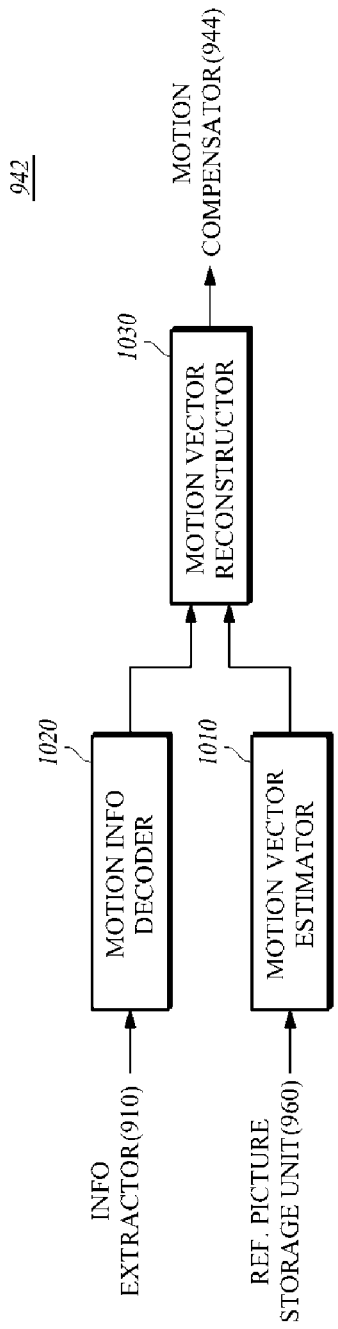
FIG. 10 is a block diagram schematically showing the construction of a motion vector decoding apparatus according to an aspect.

FIG. 10 is a block diagram schematically showing the construction of a motion vector decoding apparatus according to an aspect.

The motion vector decoding apparatus may be implemented into motion vector decoder 942 within video decoding apparatus 900 of an aspect, and thus will be called motion vector decoder 942 for the sake of descriptive convenience.

Motion vector decoder 942 according to an aspect comprises a motion vector estimator 1010, a motion information decoder 1020, and a motion vector reconstructor 1030.

Motion vector estimator 1010 estimates a first motion vector from motion vectors within a predetermined search range for estimating the first motion vector following a predetermined first estimation criterion which is shared (or commonly defined) in advance by video encoding apparatus 300 and a video decoding apparatus 900. Here, definitions of the predetermined first estimation criterion may be, assuming that it is shared (or commonly defined) in advance by video encoding apparatus 300 and a video decoding apparatus 900, may be possible by various methods including the template matching (TM) method, median calculation method, and boundary matching BM method described through FIGS. 4 to 6.

Motion information decoder 1020 reconstructs motion information by decoding the encoded motion information outputted from information extractor 910 using the entropy encoding, conditional entropy encoding, and other encoding techniques. Here, the conditional entropy encoding is same as that was described by FIG. 4 with the decoding event using different variable length coding VLC tables on the basis of the first motion vector, and therefore its detailed description will be omitted. Meanwhile, although motion information decoder 1020 may be independently implemented to perform the described functions, it may be omitted depending on the aspect of implementation or necessity and in this case, it may be incorporated at implementation into motion extractor 910.

Motion vector reconstructor 1030 uses the first motion vector from motion vector estimator 1010 and the motion information from motion information decoder 1020 to reconstruct a second motion vector. For example, motion vector reconstructor 1030 may have the second motion vector reconstructed by making substitutions with the first motion vector and motion information into Equation 8 or by exclusively counting the reconstructed motion information as the second motion vector, but assuming video encoding apparatus 300 and video decoding apparatus 900 share common information or definition, other methods are applicable to reconstruct the second motion vector without departing from the intrinsic characteristics of the disclosure. Such reconstructed second motion vector becomes the motion vector of the current block.

$$\overrightarrow{MV2} = \overrightarrow{MV1} + \overrightarrow{MV} = \begin{bmatrix} MV1_x + MV_x \\ MV1_y + MV_y \end{bmatrix}$$ [Equation 8]

Figure 11:
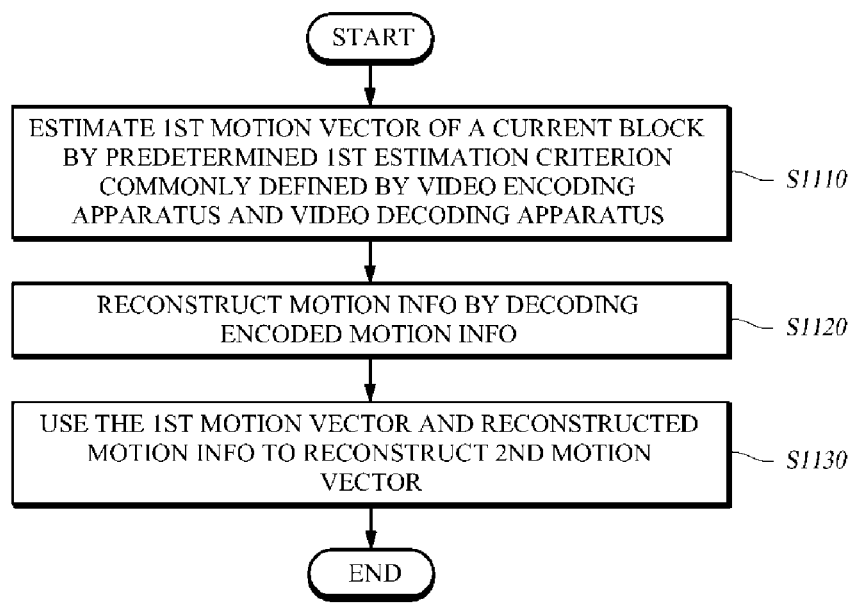
FIG. 11 is a flow diagram showing a motion vector decoding method according to an aspect.

FIG. 11 is a flow diagram showing a motion vector decoding method according to an aspect.

An aspect of the motion vector decoding apparatus, that is motion vector decoder 942 estimates a first motion vector from motion vectors within a predetermined search range for estimating the first motion vector by a predetermined first estimation criterion which is shared (or commonly defined) in advance by video encoding apparatus 300 and a video decoding apparatus 900 in step S1110, reconstructs motion information by decoding the encoded motion information outputted from information extractor 910 in step S1120, and uses the reconstructed motion information and the estimated first motion vector to reconstruct a second motion vector or the motion vector of the current block in step S1130.

Figure 12:
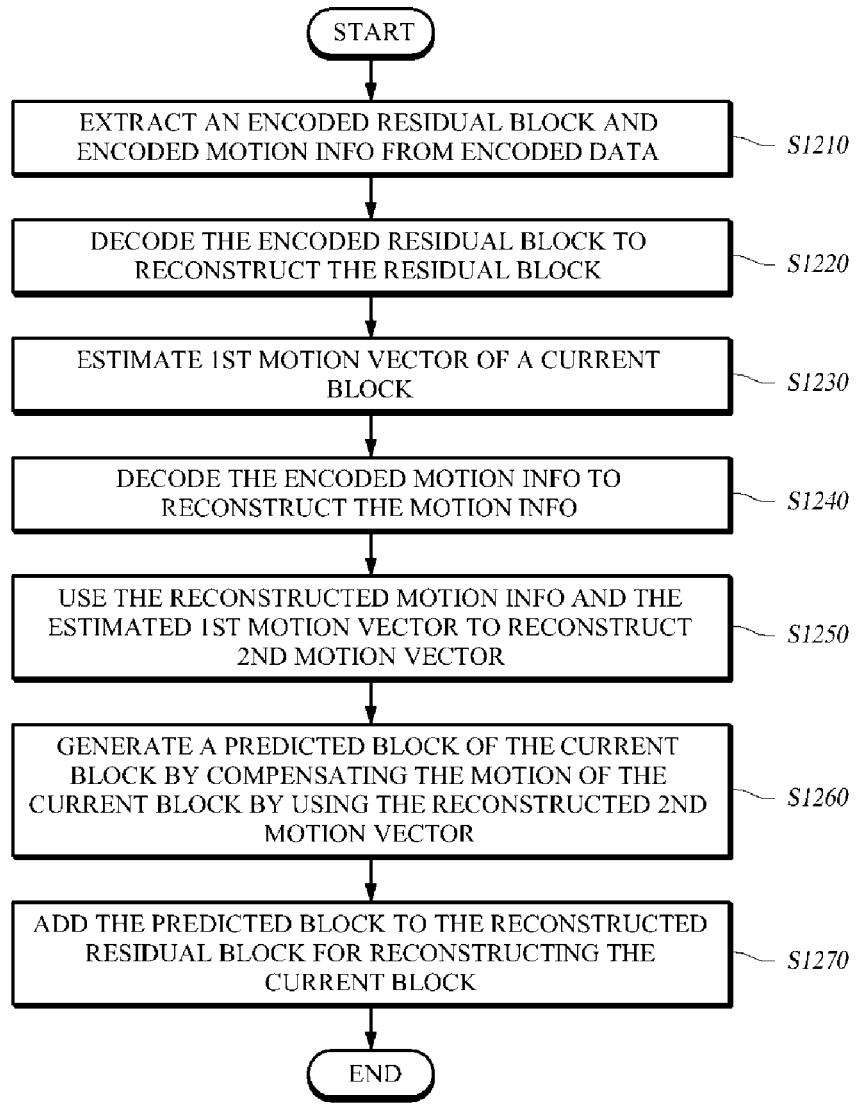
FIG. 12 is a flow diagram showing a video decoding method according to an aspect.

FIG. 12 is a flow diagram showing a video decoding method according to an aspect.

Video decoding apparatus 900, having been received and stored a bitstream or encoded data for a video via a wired/wireless network or a cable, decodes and reconstructs video for reproduction in accordance with a user selected or other program algorithms.

To this effect, video decoding apparatus 900 extracts an encoded residual block and encoded motion information from the encoded data in step S1210, and decodes the encoded residual block to reconstruct the residual block in step S1220. In addition, video decoding apparatus 900 estimates a first motion vector by a first estimation criterion predefined in agreement with video encoding apparatus 300 in step S1230, decodes the encoded motion vector to reconstruct the motion information in step S1240, and uses the reconstructed motion information and the estimated first motion vector to reconstruct the second motion vector in step S1250. Here, the reconstructed second motion vector becomes the motion vector of the current block.

Video decoding apparatus 900 generates a predicted block of the current block by compensating the motion of the current block in a reference picture by using the reconstructed second motion vector in step S1260, and adds up the reconstructed residual block and predicted block to reconstruct the current block in step S1270. The reconstructions of the current block are accumulated in storage before they are outputted as reconstructed videos or held as reference pictures.

It has been described in one aspect of the disclosure that video encoding apparatus 300 or the motion vector encoding apparatus estimates the first motion vector by the first estimation criterion predefined in agreement with video decoding apparatus 900 while video encoding apparatus 300 estimates the second motion vector by the second estimation criterion that is only estimated by video encoding apparatus 300 without a shared knowledge or shared definition with video decoding apparatus 900 (at which time the estimated second motion vector may become the optimal motion vector of the current block and may be the motion vector of the current block), thereby the first motion vector and the second motion vector are used to generate and encode the motion information. Also described is that video decoding apparatus 900 estimates the first motion vector by the first estimation criterion predefined in agreement with video encoding apparatus 300, and uses the reconstructed motion information from decoding the encoded motion information and the first motion vector to reconstruct the second motion vector as the motion vector of the current block.

However, this aspect of the present disclosure may be generalized as will be described in another aspect wherein for encoding the motion vector, not just two motion vectors consisted of the first and second motion vectors are estimated to have motion information encoded as in the previous aspect but estimations are performed on multiple motion vectors wherein the first motion vector is estimated by more than one event and an optimum of the second motion vector is estimated to encode the motion information. Of course, decoding the motion vector is correspondingly carried out by estimating the first motion vector by more than one event and using the reconstructed motion information and one or more motion vectors to reconstruct the single motion vector of the motion vector of the current block.

In other words, the motion vector encoding apparatus according to another aspect may comprise a motion vector estimator for estimating a plurality of motion vectors with estimating one of the plurality of motion vectors as the motion vector of the current block and estimating the remaining motion vectors by one or more predefined estimation criteria in agreement with a video decoding apparatus, and a motion vector or information encoder for encoding motion information generated by using the plurality of motion vectors.

Here, the motion vector estimator may use one or more of the template matching TM method, median calculation method, and boundary matching BM method as the estimating criteria in order to estimate the remaining motion vectors, and use the rate-distortion optimization to estimate the one motion vector.

In addition, the motion information encoder may generate the differences between the one motion vector and the remaining motion vectors as motion information, and it may perform the encoding by using different variable length coding VLC tables on the basis of the first motion vector. For an example, the motion information encoder may use a first VLC table when the absolute magnitude values of the remaining motion vectors are under a predetermined first boundary value, use a second VLC table when the absolute magnitude values of the remaining motion vectors are equal to or over the first boundary value and under a predetermined second boundary value, and use a third VLC table when the absolute magnitude values of the remaining motion vectors are equal to or over the second boundary value.

A motion vector encoding method of another aspect may comprise and be carried out by a step of predicting a plurality of motion vectors with estimating one of the plurality of motion vectors as a motion vector of a current block and estimating the remaining motion vectors by one or more predefined criteria in agreement with a video decoding apparatus and a step of encoding motion information generated by using the plurality of motion vectors.

A motion vector encoding apparatus of another aspect may comprise a predictor for encoding motion information generated by estimating a plurality of motion vectors and generating a predicted block of a current block by using one motion vector of a plurality of motion vectors as a motion vector of the current block, a subtractor for subtracting the predicted block from the current block to generate a residual block, an encoder for encoding the residual block, and an encoded data generator for generating and outputting encoded data containing encoded motion information and the encoded residual block.

Here, the predictor may estimate the one motion vector of the plurality of motion vectors by a criterion out of an agreement with a video decoding apparatus, and estimate the remainder of the plurality of motion vectors by a predetermined estimation criterion commonly defined with the video decoding apparatus. The one motion vector of the plurality of motion vectors may be a motion vector that cannot be estimated by the video decoding apparatus, and the remaining motion vectors may be those which can be estimated by the video decoding apparatus.

A video encoding method of yet another aspect may comprise a step of performing a prediction by encoding motion information generated by estimating a plurality of motion vectors and generating a predicted block of a current block by using one motion vector of the plurality of motion vectors as a motion vector of the current block, steps of subtracting the predicted block from the current block to generate a residual block, encoding the residual block, and generating and outputting encoded data containing encoded motion information and the encoded residual block.

A motion vector decoding apparatus of yet another aspect may comprise a motion vector estimator for estimating one or more motion vectors by one or more estimation criteria commonly predefined with a video encoding apparatus, a motion information reconstructor for reconstructing encoded motion information by decoding the same, and a motion vector reconstructor for reconstructing a motion vector of a current block by using the reconstructed motion information and the estimated one or more motion vectors.

Here, the motion vector estimator may use one or more of the template matching TM method, median calculation method, and boundary matching BM method for the one or more estimation criteria. The motion information reconstructor may perform the decoding by using different variable length coding VLC tables on the basis of the one or more motion vectors, and in particular it may use a first VLC table when the absolute values of the magnitudes of the one or more motion vectors are under a preset first boundary value, use a second VLC table when the absolute magnitude values of the one or more motion vectors are equal to or over the first boundary value and under a second boundary value, and use a third VLC table when the absolute magnitude values of the one or more motion vectors are equal to or over the second boundary value. The motion vector reconstructor may reconstruct the sum of the reconstructed motion information and the estimated one or more motion vectors as the motion vector of the current block.

A motion vector decoding method of yet another aspect may comprise steps of estimating one or more motion vectors by one or more estimation criteria commonly predefined with a video encoding apparatus, reconstructing encoded motion information by decoding the same, and reconstructing a motion vector of a current block by using the reconstructed motion information and the estimated one or more motion vectors.

A motion vector decoding apparatus of yet another aspect may comprise an information extractor for extracting an encoded residual block and encoded motion information from encoded data; a decoder for decoding the encoded residual block to generate a reconstructed residual block; an estimator for estimating one or more motion vectors by one or more estimation criteria commonly predefined with a video encoding apparatus, reconstructing, via decoding of, the encoded motion information, reconstructing a motion vector of a current block by using the reconstructed motion information and the estimated one or more motion vectors, and generating a predicted block of the current block by using the reconstructed motion vector of the current block; and an adder for adding the predicted block to the reconstructed residual block to reconstruct the current block.

A video decoding method of yet another aspect may comprise steps of extracting an encoded residual block and encoded motion information from encoded data; decoding the encoded residual block to generate a reconstructed residual block; performing a prediction by estimating one or more motion vectors by one or more estimation criteria commonly predefined with a video encoding apparatus, reconstructing, via decoding of, the encoded motion information, reconstructing a motion vector of a current block by using the reconstructed motion information and the estimated one or more motion vectors, and generating a predicted block of the current block by using the reconstructed motion vector of the current block; and a step of adding the predicted block to the reconstructed residual block to reconstruct the current block.

As described above, since it becomes possible by the present disclosure, based on one or more motion vectors that the video encoding apparatus and the video decoding apparatus can commonly estimate, to encode the motion vector of the current block which was the optimal motion vector only the video encoding apparatus 300 could estimate, the motion vector can be encoded using more accurate estimated value saving the need for an extra encoding operation on information of the identification of certain motion vector, which reduces the bit rate for encoding motion vectors and thereby improves the video compression efficiency.

In addition, according to the present disclosure, the video encoding apparatus and the video decoding apparatus share or commonly define a predetermined estimation criterion by which one or more motion vectors may be estimated, thereby obviating the need for an extra encoding of information for estimating the one or more motion vectors resulting in a reduction of the bit rate for encoding motion vectors and in turn an improvement of the video compress efficiency.

Further, according to aspects of the present disclosure, the video decoding apparatus may determine image characteristics on the basis of one or more motion vectors (for example, a first motion vector in an aspect) that the video decoding apparatus can estimate by itself, and selectively use the most effective variable length coding VLC table for encoding the motion vectors considering the determined image characteristics to encode the motion vector or motion information, thereby becoming adaptable to various image characteristics. This is in a contrast to conventional motion vector encoding methods where the image characteristics are not considered but the differential value between a set motion vector and a predicted vector is encoded using a predetermined variable length coding table setting, failing to provide adaptable performances to the variety of image characteristics.

In the description above, although all of the components of the aspect of the present disclosure may have been explained as assembled or operatively connected as a unit, the present disclosure is not intended to limit itself to such aspect. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the disclosure have been described for illustrative purposes, those skilled in the art will appreciate that various modifications, additions and substitutions are possible, without departing from the essential characteristics of the disclosure. Therefore, the aspects disclosed in the present disclosure have been described not for limiting the technical idea of the disclosure, but for explaining the disclosure. Accordingly, the scope of the disclosure should be interpreted by the appended claims, which by themselves and their equivalents are the claim scope of the disclosure.

The invention claimed is:

1. A video decoding apparatus using an inter prediction, the apparatus comprising
    an information extractor configured to obtain motion information and residual data from encoded data;
    a predictor configured to generate a predicted block by performing the inter prediction based on the obtained motion information;
    a decoder configured to
        identify one or more conditions for enabling an inverse quantization and an inverse transform,
        skip both of the inverse quantization and the inverse transform for the obtained residual data to thereby reconstruct a residual block directly from the obtained residual data, when the one or more identified conditions indicate skipping of both the inverse quantization and the inverse transform,
        inversely quantize the obtained residual data and skip the inverse transform for the inversely quantized residual data to thereby reconstruct a residual block using the inverse-quantized residual data, when the one or more identified conditions indicate skipping of the inverse transform, and
        inversely quantize the obtained residual data and inversely transform the inversely quantized residual data to thereby reconstruct a residual block using the inverse transformed residual data, when the one or more identified conditions indicate non-skipping of both the inverse quantization and the inverse transform; and
    an adder configured to add each pixel value of the predicted block to a corresponding pixel value of the reconstructed residual block.

2. The apparatus of claim 1, wherein the decoder is configured to identify the one or more conditions for enabling the inverse quantization and the inverse transform based on information included in the encoded data.

3. The apparatus of claim 1, wherein the motion information includes a differential motion vector and a reference picture index.

4. The apparatus of claim 3, wherein the predictor is configured to
    select a candidate motion vector from one or more candidate motion vectors,
    reconstruct a current motion vector by adding the differential motion vector to the selected candidate motion vector, and
    generate the predicted block by using the current motion vector and a reference picture indicated by the reference picture index.

* * * * *